United States Patent
Tanaka

(10) Patent No.: US 10,375,190 B2
(45) Date of Patent: Aug. 6, 2019

(54) NON-TRANSITORY COMPUTER READABLE MEDIUM STORING COMMUNICATION PROGRAM, COMMUNICATION DEVICE AND INFORMATION PROCESSING APPARATUS

(71) Applicant: FUJI XEROX CO., LTD., Tokyo (JP)

(72) Inventor: Tatsuyuki Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 289 days.

(21) Appl. No.: 15/216,761

(22) Filed: Jul. 22, 2016

(65) Prior Publication Data
US 2017/0279908 A1    Sep. 28, 2017

(30) Foreign Application Priority Data
Mar. 24, 2016  (JP) .................... 2016-059693

(51) Int. Cl.
| | | |
|---|---|---|
| G06F 15/16 | (2006.01) | |
| H04L 29/08 | (2006.01) | |
| H04L 12/707 | (2013.01) | |
| H04L 12/24 | (2006.01) | |
| H04L 29/14 | (2006.01) | |
| H04L 12/26 | (2006.01) | |
| H04L 12/58 | (2006.01) | |

(52) U.S. Cl.
CPC .......... *H04L 67/26* (2013.01); *H04L 41/0816* (2013.01); *H04L 45/22* (2013.01); *H04L 69/40* (2013.01); *H04L 41/0631* (2013.01); *H04L 43/0823* (2013.01); *H04L 51/16* (2013.01)

(58) Field of Classification Search
CPC ..... H04L 67/26; H04L 41/0816; H04L 45/22; H04L 51/16

USPC .......................................... 709/206
See application file for complete search history.

(56) References Cited

U.S. PATENT DOCUMENTS

| | | | |
|---|---|---|---|
| 5,790,558 A * | 8/1998 | Nakamura ......... | G05B 19/4063 714/704 |
| 6,349,304 B1 * | 2/2002 | Boldt ................... | G06F 3/1204 |
| 6,397,245 B1 * | 5/2002 | Johnson, II ......... | G06F 11/2294 709/203 |

(Continued)

FOREIGN PATENT DOCUMENTS

JP    2014-68317    4/2014

OTHER PUBLICATIONS

Wang et al. "Automatic Misconfiguration Troubleshooting with PeerPressure". 2004. pp. 1-22. (Year: 2004).*

(Continued)

*Primary Examiner* — Imad Hussain
(74) *Attorney, Agent, or Firm* — Fildes & Outland, P.C.

(57) ABSTRACT

A non-transitory computer readable medium storing a program causing a computer to execute a process, the process including: selecting in a case where an error occurs in communication between a communication device and a communication target device, a setting item to be changed in order to handle the occurred error by referring to information in which a type of an error is previously correlated with a setting item to be changed; acquiring a setting value of another communication device regarding the selected setting item; and determining a setting value of the communication device based on the acquired setting value of the other communication device.

4 Claims, 13 Drawing Sheets

(56) References Cited

U.S. PATENT DOCUMENTS

| | | | | |
|---|---|---|---|---|
| 6,757,723 B1* | 6/2004 | O'Toole | G06K 13/0825 | 709/222 |
| 7,620,848 B1* | 11/2009 | Tanner | G06F 11/0709 | 709/224 |
| 7,840,652 B2* | 11/2010 | Schran | G06Q 20/382 | 709/220 |
| 8,095,632 B2* | 1/2012 | Hessmer | H04L 69/329 | 709/223 |
| 8,145,789 B1* | 3/2012 | Stamler | H04L 41/0672 | 709/244 |
| 8,161,275 B1* | 4/2012 | Woodward | G06F 9/45504 | 713/1 |
| 8,199,638 B2* | 6/2012 | Taylor | H04L 12/5601 | 370/228 |
| 8,392,548 B1* | 3/2013 | Goldschlager | H04L 41/069 | 709/223 |
| 8,606,754 B2* | 12/2013 | Xia | H04M 15/00 | 707/652 |
| 9,055,424 B1 | 6/2015 | Gravette | H04W 4/20 | |
| 9,374,194 B2* | 6/2016 | Glosser, Jr. | H03M 13/05 | |
| 2002/0085508 A1* | 7/2002 | Suonsivu | H04L 41/044 | 370/256 |
| 2002/0099787 A1* | 7/2002 | Bonner | H04L 41/042 | 709/216 |
| 2004/0081104 A1* | 4/2004 | Pan | G06F 9/4405 | 370/254 |
| 2004/0103210 A1* | 5/2004 | Fujii | H04L 45/00 | 709/239 |
| 2004/0133689 A1* | 7/2004 | Vasisht | H04L 29/12216 | 709/228 |
| 2004/0162092 A1* | 8/2004 | Marsico | H04M 3/42153 | 455/463 |
| 2004/0170174 A1* | 9/2004 | Marsico | H04L 51/38 | 370/392 |
| 2004/0205244 A1* | 10/2004 | Marsico | H04L 51/38 | 709/245 |
| 2004/0208501 A1* | 10/2004 | Saunders | H04B 10/0793 | 398/9 |
| 2004/0208507 A1* | 10/2004 | Saunders | H04B 10/0793 | 398/19 |
| 2005/0188268 A1* | 8/2005 | Verbowski | G06F 11/0748 | 714/37 |
| 2006/0126111 A1* | 6/2006 | Song | H04N 1/00347 | 358/1.15 |
| 2007/0019745 A1* | 1/2007 | Donadio | H04L 41/0663 | 375/259 |
| 2007/0189476 A1* | 8/2007 | Marsico | H04M 3/42153 | 379/142.01 |
| 2007/0220304 A1* | 9/2007 | Slater | G06F 11/1464 | 714/4.11 |
| 2007/0294090 A1* | 12/2007 | Thieret | G05B 23/0248 | 705/305 |
| 2008/0031238 A1* | 2/2008 | Harmelin | H04L 41/0843 | 370/389 |
| 2009/0013210 A1* | 1/2009 | McIntosh | H04L 41/0672 | 714/4.1 |
| 2009/0044185 A1* | 2/2009 | Krivopaltsev | H04L 29/06 | 717/173 |
| 2009/0147699 A1* | 6/2009 | Ruy | H04L 29/12254 | 370/254 |
| 2009/0193102 A1* | 7/2009 | Trujillo | G06F 11/1469 | 709/220 |
| 2009/0320098 A1* | 12/2009 | Roberts | H04L 12/2818 | 726/3 |
| 2010/0100774 A1* | 4/2010 | Ding | G06F 11/3636 | 714/45 |
| 2010/0259782 A1* | 10/2010 | Kotake | G06F 11/0733 | 358/1.15 |
| 2011/0106774 A1* | 5/2011 | Wickremesinghe | H04L 41/0856 | 707/695 |
| 2011/0302282 A1* | 12/2011 | Dadlani Mahtani | H05B 37/0272 | 709/221 |
| 2013/0007732 A1* | 1/2013 | Fries | G06F 9/45533 | 718/1 |
| 2014/0085677 A1 | 3/2014 | Saito | | |
| 2014/0330920 A1* | 11/2014 | Shao | H04L 12/437 | 709/206 |
| 2015/0256400 A1* | 9/2015 | Venkatesan | H04L 41/0886 | 370/255 |
| 2015/0372905 A1* | 12/2015 | Hu | H04L 67/104 | 370/389 |
| 2015/0382215 A1* | 12/2015 | Huang | H04W 24/08 | 370/252 |
| 2016/0209997 A1* | 7/2016 | Lee | G06F 3/0482 | |
| 2016/0288744 A1* | 10/2016 | Rutherford | B60L 1/00 | |
| 2017/0118041 A1* | 4/2017 | Bhattacharya | H04L 12/462 | |
| 2017/0149921 A1* | 5/2017 | Nassi | G06F 9/45558 | |

OTHER PUBLICATIONS

Aggarwal et al. "NetPrints: Diagnosing Home Network MisconfigurationsUsing Shared Knowledge". 2009. pp. 1-25. (Year: 2009).*

* cited by examiner

| OCCURRENCE DATE AND TIME | OPERATION TYPE | RESULT | ERROR CODE | COMMUNICATION PARTNER | USER NAME |
|---|---|---|---|---|---|
| 2015.12.1 09:10 | SCANNING | ABNORMAL END | E-PRN-002 | PC-1(192.168.0.3) | GUEST |

| ERROR CODE | COPING METHOD | COPING TARGET | CHANGE TIMING |
|---|---|---|---|
| E-PRN-001 | INCREASING SIMULTANEOUS COMMUNICATION CAPABLE NUMBER | MULTIFUNCTION MACHINE | DURING LOW OPERATION |
| E-PRN-002 | INCREASING COMMUNICATION TIMEOUT TIME | MULTIFUNCTION MACHINE | IMMEDIATELY |
| E-PRN-101 | SPOOL SETTING IS NOT APPROPRIATE | PC | NA |
| E-PRN-102 | CHARACTER CODE SETTING IS NOT APPROPRIATE | PC | NA |
| E-WEB-001 | PROXY SERVER SETTING IS NOT APPROPRIATE | MULTIFUNCTION MACHINE | IMMEDIATELY |

| DEVICE NAME | COMMUNICATION TIMEOUT TIME (SECOND) |
|---|---|
| MFP-1 | 10 |
| MFP-2 | 60 |
| MFP-3 | 60 |
| MFP-4 | 60 |

| DEVICE NAME | NUMBER OF TIMES OF OCCURRENCE OF E-PRN-001 | SIMULTANEOUS COMMUNICATION CAPABLE NUMBER |
|---|---|---|
| MFP-1 | 1 | 2 |
| MFP-2 | 0 | 5 |
| MFP-3 | 2 | 5 |
| MFP-4 | 0 | 5 |

113 CHANGE HISTORY INFORMATION

| COPING DATE AND TIME | ERROR CODE | SETTING INFORMATION | SETTING VALUE | MAIN EXECUTING AGENT |
|---|---|---|---|---|
| 2015.11.31 18:00 | NA | MEMORY SETTING | HDD SPOOL | MANAGER |
| 2015.12.1 09:12 | E-PRN-002 | COMMUNICATION TIMEOUT TIME | 60 | MFP |

NON-TRANSITORY COMPUTER READABLE MEDIUM STORING COMMUNICATION PROGRAM, COMMUNICATION DEVICE AND INFORMATION PROCESSING APPARATUS

CROSS-REFERENCE TO RELATED APPLICATIONS

This application is based on and claims priority under 35 USC 119 from Japanese Patent Application No. 2016-059693 filed on Mar. 24, 2016.

BACKGROUND

Technical Field

The present inventions relates to a non-transitory computer readable medium storing a communication program, a communication device and an information processing apparatus.

SUMMARY

According to an aspect of the present invention, there is provided a non-transitory computer readable medium storing a program causing, a computer to execute a process, the process including: selecting, in a case where an error occurs in communication between a communication device and a communication target device, a setting item to be changed in order to handle the occurred error by referring to information in which a type of an error is previously correlated with a setting item to be changed; acquiring a setting value of another communication device regarding the selected setting item; and determining a setting value of the communication device based on the acquired setting value of the other communication device.

BRIEF DESCRIPTION OF THE DRAWINGS

Exemplary embodiments of the present invention will be described in detail based on the following figures, wherein:

FIG. 4 is a schematic diagram illustrating an example of a configuration of error handling information;

FIG. 5 is a schematic diagram illustrating an example of a setting value acquired by an external-device setting-acquisition unit;

FIG. 10 is a schematic diagram illustrating an example of a setting value acquired by the external-device setting-acquisition unit;

FIG. 12 is a schematic diagram illustrating a configuration of change history information.

DETAILED DESCRIPTION

First Exemplary Embodiment
Configuration of Communication System

Figure 1:
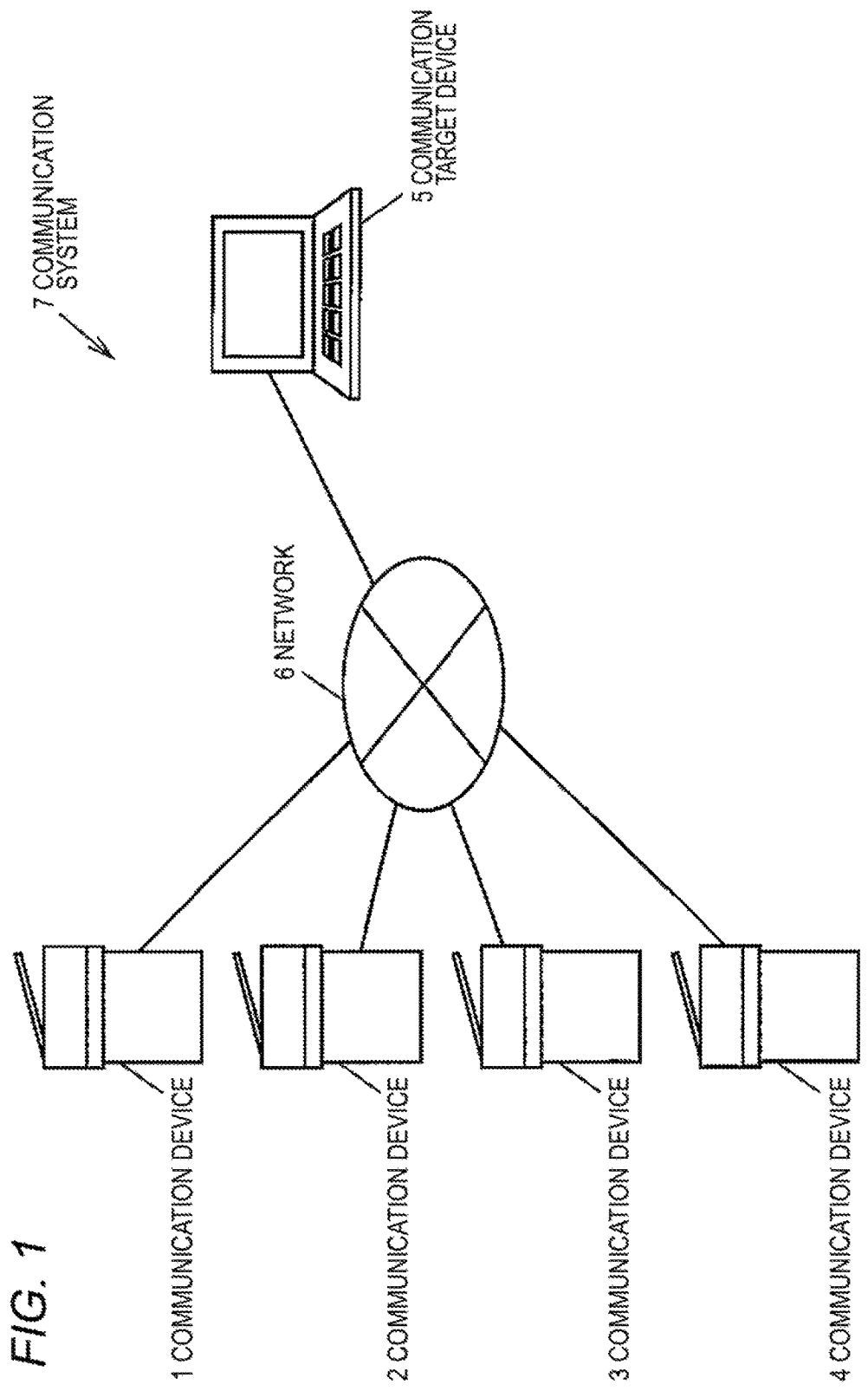
FIG. 1 is a schematic diagram illustrating an example of a configuration of a communication system according to a first exemplary embodiment.

FIG. 1 is a schematic diagram illustrating an example of a configuration of a communication system according to a first exemplary embodiment.

A communication system 7 has a configuration in which communication devices 1 to 4 and a communication target device 5 are connected to each other by a network 6, so as to enable communication.

As an example, the communication devices 1 to 4 may be a multifunction machine which includes functions of printing, scanning, FAX, and the like, and may be a communication device communicating with the communication target device 5 in order to perform the function. Each of the communication devices 1 to 4 includes an electronic component such as a central processing unit (CPU) or a flash memory, in the main body. The electronic component has a function for processing information.

The communication devices 2 to 4 are assumed to be products which have the same configuration as that in this exemplary embodiment. However, it is not necessary that the communication devices 2 to 4 have completely the same configuration as that of the communication device 1. The communication devices 2 to 4 may have a built-in OS, a product model, a manufacturer, and the like which are different from those of the communication device 1.

The communication target device 5 is a device such as a server, which has a communication function. The communication target device 5 includes electronic components such as a CPU and a flash memory, in a main body. The electronic components have a function for processing information.

The network 6 is a communication network which allows high-speed communication. For example, as the network 6, a wired or wireless communication network such as an intranet and a local area network (LAN) is provided.

The communication devices 1 to 4 are assumed to generate image information by scanning an original document using, so-called "Scan to SMB", and to transmit the generated image information to a shared folder which is formed in a memory of the communication target device 5, through the network 6. It is assumed that errors such as authentication failure or character corruption occur between the communication device 1 and the communication target device 5. On the above assumption, the communication device 1 refers to setting values of the communication devices 2 to 4, and attempts to solve an error occurring between the communication device 1 and the communication target device 5.

Here, in this exemplary embodiment, "an error" occurring, between the communication device 1 and the communication target device 5 means an error occurring due to a setting of a communication protocol in the communication device 1 and the communication target device 5. As the error occurring due to the setting of the communication protocol, as described above, for example, failure of authentication, occurrence of character corruption, and the like are exemplified. As an example of failure of authentication, a case where a transmission side and a reception side have different settings in an authentication method from each other, a case where settings of a domain name for authentication are different from each other, and thus the authentication fails, and the like are exemplified. As an example of the occurrence of character corruption, regarding a character code of a file name which is transmitted, a case in which since the character code of the transmission side is set as "EUC-JP" and the character code of the reception side is set as "UTF-8", difference in separation, matching, or the like of characters occurs, and thus, character corruption in a file name occurs on the reception side is exemplified.

In this exemplary embodiment, the "setting of communication" is assumed to designate an item which is not automatically set, not a setting item which is automatically set by communication on the communication protocol between the communication device 1 and the communication target device 5. However, regarding the setting item which is automatically set by communication on the communication protocol, an error may also occur in a setting situation of the entirety he network to which a device other than the communication device 1 and the communication target device 5 is connected. Thus, the "setting of communication" may include the setting item which is automatically set.

Configuration of Communication Device

Figure 2:
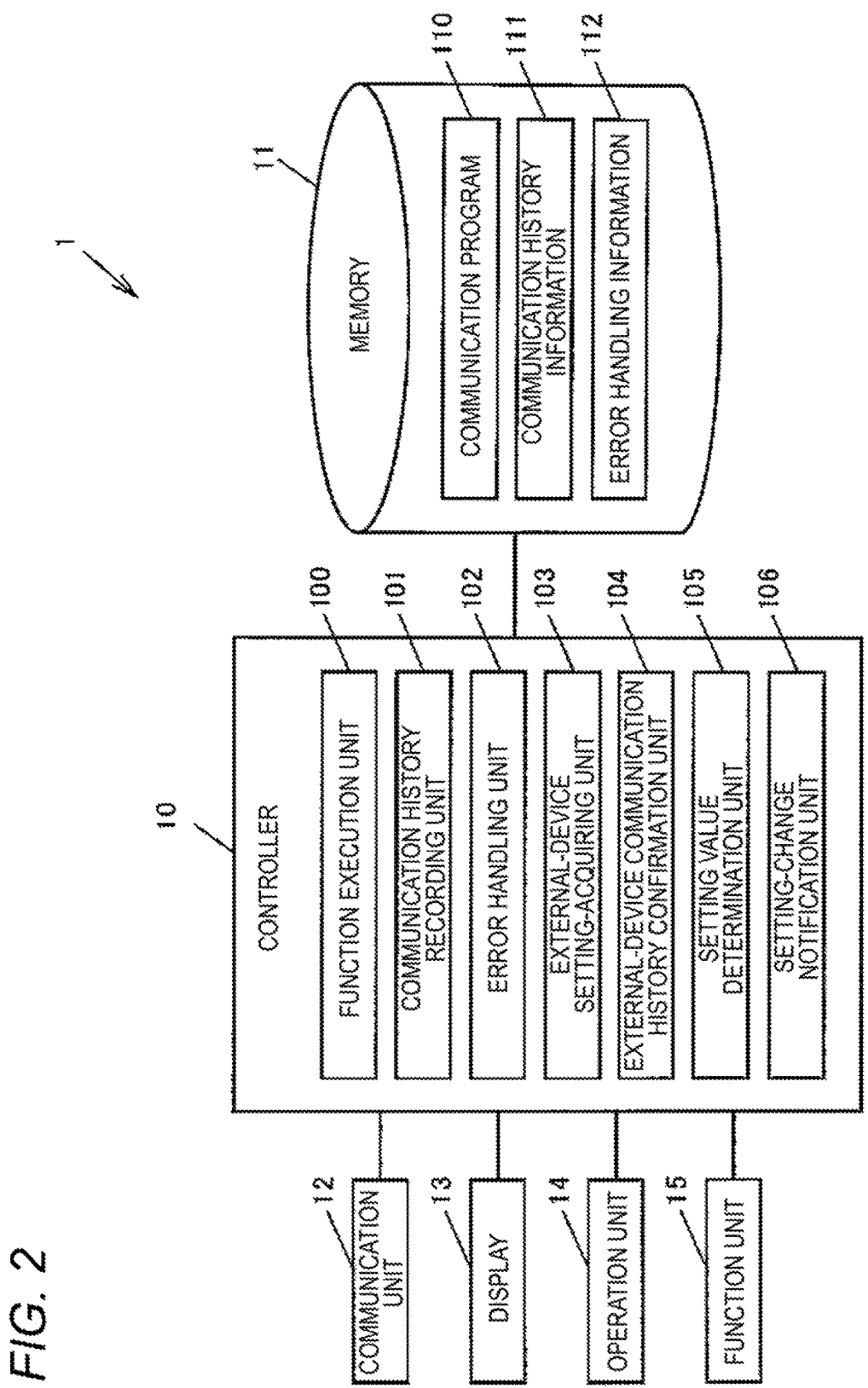
FIG. 2 is a block diagram illustrating a configuration example of a communication device according to the first exemplary embodiment.

FIG. 2 is a block diagram illustrating a configuration example of the communication device 1 according to the first exemplary embodiment.

The communication device 1 includes a controller 10, a memory 11, a communication unit 12, a display 13, an operation unit 14, and a function unit 15. The controller 10 is configured from a CPU and the like. The controller 10 controls the units and executes various programs. The memory 11 is configured from a recording medium such as a flash memory, and stores information. The communication unit 12 performs communication with an external device through a network. The display 13 is configured from a liquid crystal display (LCD) and the like, and displays a letter or an image. The operation unit 14 is configured from a button, a touchpad, and the like, and receives an input operation. The function unit 15 performs functions of printing, scanning, FAX, and the like.

The controller 10 executes as communication program 110 (which will be described later) so as to perform functions as a function execution unit 100, a communication history recording unit 101, an error handling unit 102, an external-device setting-acquiring unit 103, an external-device communication history confirmation unit 104, a setting value determination unit 105, and a setting-change notification unit 106.

The function execution unit 100 causes the function unit 15 to perform a function of printing, scanning, FAX, or the like. "Scan to SMB" as an example of the function is performed by the function execution unit 100. Communication is performed through the communication unit 12.

The communication history recording unit 101 records a communication result obtained when the function unit 15 performs the function of "Scan to SMB", and communicates with the communication target device 5 through the communication unit 12. The communication history recording twit 101 records the communication result as communication history information 111. Particularly, in a case where an error occurs, the communication history recording unit 101 records an error code indicating the type of the error.

The error handling unit 102 refers to the error handling information 112 regarding a predetermined coping method for an error code, and selects the corresponding coping method so as to handle the error.

The external-device setting-acquiring unit 103 inquires a setting value of the coping method selected by the error handling unit 102, of the communication devices 2 to 4. The external-device setting-acquiring unit 103 acquires setting values from the communication devices 2 to 4.

The external-device communication history confirmation unit 104 performs inquiry for the communication devices 2 to 4, and confirms communication history of the communication devices 2 to 4. Particularly, the external-device communication history confirmation unit 104 confirms whether errors do not occur in the communication devices 2 to 4 with the setting values acquired by the external-device setting-acquiring unit 103.

The setting value determination unit 105 determines a setting value for the coping method selected by the error handling unit 102, based on he setting values which are acquired by the external-device setting-acquiring unit 103. The setting value determination unit 105 determines the setting value in accordance with details confirmed by the external-device communication history confirmation unit 104.

In a case where the setting value in the communication is changed to the setting value determined by the setting value determination unit 105, the setting-change notification unit 106 notifies an external manager of details of the change.

The memory 11 stores the communication program 110 for operating the controller 10 as the above-described units 100 to 106, the communication history information 111, the error handling information 112, and the like.

Operation of Communication Device

Figure 6:
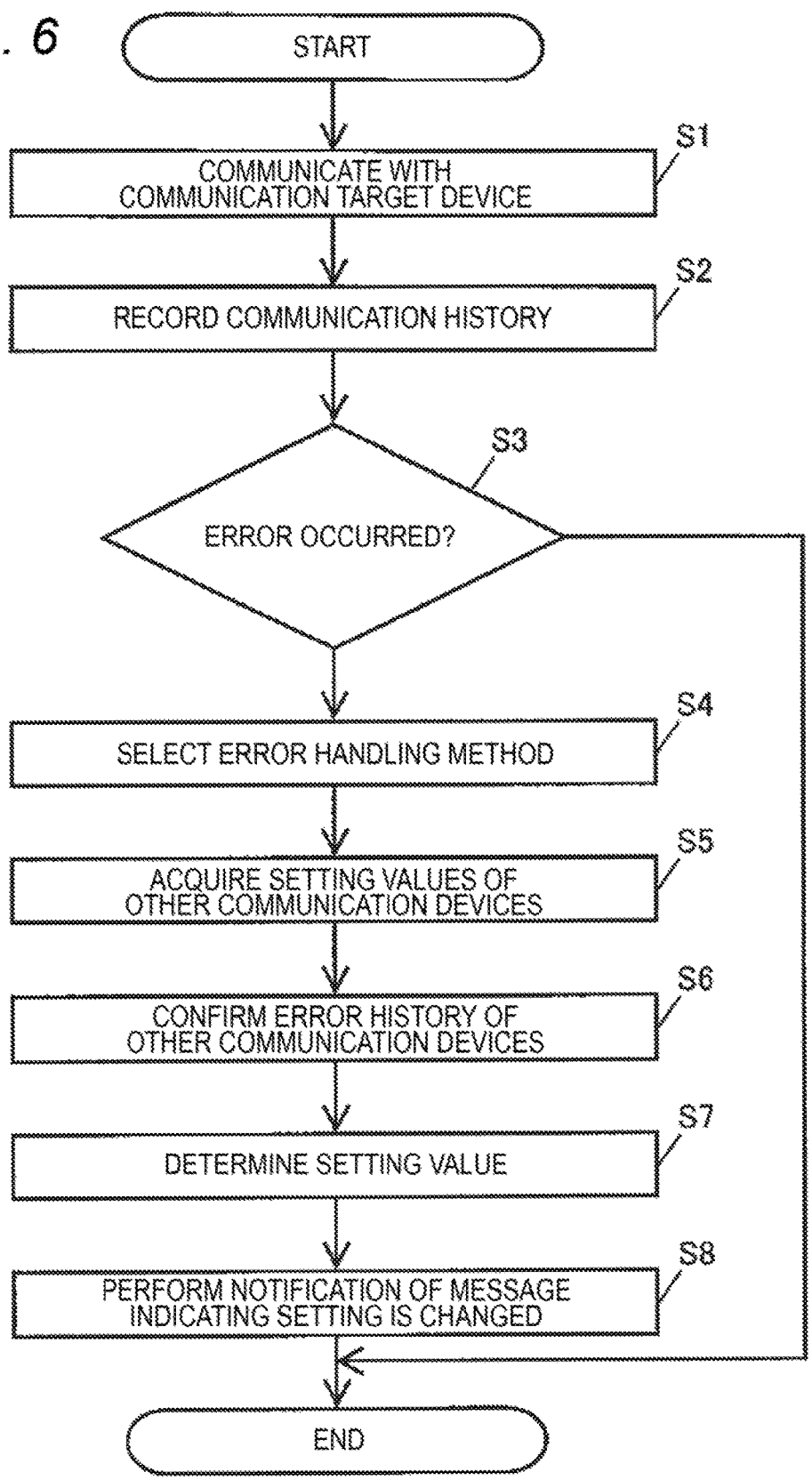
FIG. 6 is a flowchart illustrating an example of an operation of the communication device.

Next, an action in the exemplary embodiment will be described. FIG. 6 is a flowchart illustrating an example of an operation of the communication device 1.

Firstly if the operation unit 14 receives an operation, the function execution unit 100 causes the function unit 15 to perform "Scan to SMB". The function unit 15 scans an original document so as to generate image information. The function unit 15 communicates with the communication target device 5 through the communication unit 12, in order to transmit the generated image information to the shared folder of the communication target device 5 (S1).

Then, the communication history recording unit 101 causes the function unit 15 to perform the function of "Scan to SMB". The communication history recording unit 101 records a communication result obtained when communication with the communication target device 5 is performed through the communication unit 12, as the communication history information 111 (S2). Particularly, in a case where an error occurs, as illustrated in the following FIG. 3, the communication history recording unit 101 records an error code indicating the type of the error.

Figure 3:
FIG. 3 is a schematic diagram illustrating an example of a configuration of communication history information.

FIG. 3 is a schematic diagram illustrating an example of a configuration of the communication history information 111.

Communication history information 111a is an example of the communication history information 111. The communication history information includes date and time of communication, an operation type of an operation of the communication device, the communication result, the error code indicating the type of an error which is recorded in a case where the error occurs, communication partner, and a user name of a user who uses the communication device 1.

The above example describes a case where an error having an error code of "E-PRN-002" occurs and thus communication is abnormally ended when a user "Guest" operates the communication device 1 to perform scanning for "Scan to SMB", and communication is performed so as to transmit image information generated by the scanning to "PC-1" indicating the communication target device 5.

Then, in a case where such an error occurs in the communication (S3; Yes), the error handling unit 102 refers to the error handling information 112 illustrated in the following FIG. 4, and selects the corresponding coping method so as to handle the error (S4).

FIG. 4 is a schematic diagram illustrating an example of a configuration of the error handling information 112.

Error handling information 112a includes an error code, a coping method indicating details of coping, a coping target, and a change timing for changing the setting value.

In the example illustrated in FIG. 3, the error code is "E-PRN-002". Thus the error handling unit 102 refers to the error handling information 112a, and selects a coping method of "increasing a communication timeout time" for a coping target of "multifunction machine" (which instructs the Communication device 1) as the coping method. Since the change timing is "immediately", the selected coping method is immediately performed.

Then, the external-device setting-acquiring unit 103 inquires a setting value of the coping method selected by the error handling unit 102, of the communication devices 2 to 4. The external-device setting-acquiring unit 103 acquires setting values from the communication devices 2 to 4 (S5).

FIG. 5 is a schematic diagram illustrating an example of the setting value acquired by the external-device setting-acquiring unit 103.

A setting value 103a includes a device name of an external device and a communication timeout time serving as an example of a setting value.

The above example describes a case where a setting value of a device name "MFP-1" indicating the communication device 1 before changing is "10" seconds, but each of setting values of device names "MFP-2" to "MFP-4" indicating the communication devices 2 to 4 is "60" seconds.

Then, the external-device communication history confirmation unit 104 performs an inquiry for the communication devices 2 to 4, and confirms communication history of each of the communication devices 2 to 4 (S6). Particularly, the external-device communication history confirmation unit 104 confirms whether an error does not occur in the communication devices 2 to 4 with the setting values of "60" seconds acquired by the external-device setting-acquiring unit 103.

The setting value determination unit 105 determines a setting value for the coping method selected by the error handling unit 102, based on the setting values which are acquired by the external-device setting-acquiring unit 103. That is, since the setting values of the device names "MFP-2" to "MFP-4" which indicate external devices other than the device name "MFP-1" indicating the communication device 1 is "60" seconds, the setting value determination unit 105 extends the communication timeout time from "10" seconds up to "60" seconds.

When the external device communication history confirmation unit 104 confirms that an error does not occur with the setting value of "60" seconds in the communication devices 2 to 4, the setting value determination unit 105 determines the setting value to be "60" seconds (S7).

Then, the setting-change notification unit 106 notifies a terminal used by an outside manager, of a message indicating that the communication timeout time is changed to the setting value of "60" seconds determined by the setting value determination unit 105 (S8).

Advantages of First Exemplary Embodiment

According to the above-described first exemplary embodiment, in a case where an error occurs in communication with the communication target device 5, the setting value of the communication device 1 can be changed based on the setting values of the other communication devices 2 to 4 which are connected to the network 6. Thus, it is possible to handle the error without a need for an operation of a manager. Even in a situation, for example, where the communication device 1 is newly added to the communication system 7, the communication device 1 can be set so as to match with the settings of the other communication devices 2 to 4, without setting by a manager.

Since confirmation of whether no error occurs is performed with reference to the communication history of each of the communication devices 2 to 4, reliability of the setting value of the communication device 1 is improved.

Second Exemplary Embodiment

A second exemplary embodiment is different from the first exemplary embodiment in that the communication device 1 performs an inquiry for the other communication devices 2 to 4, but a server device is newly disposed, and the communication device 1 performs an inquiry for the server device so as to handle an error. Components common with those in the first exemplary embodiment are denoted by the common reference signs.

Figure 7:
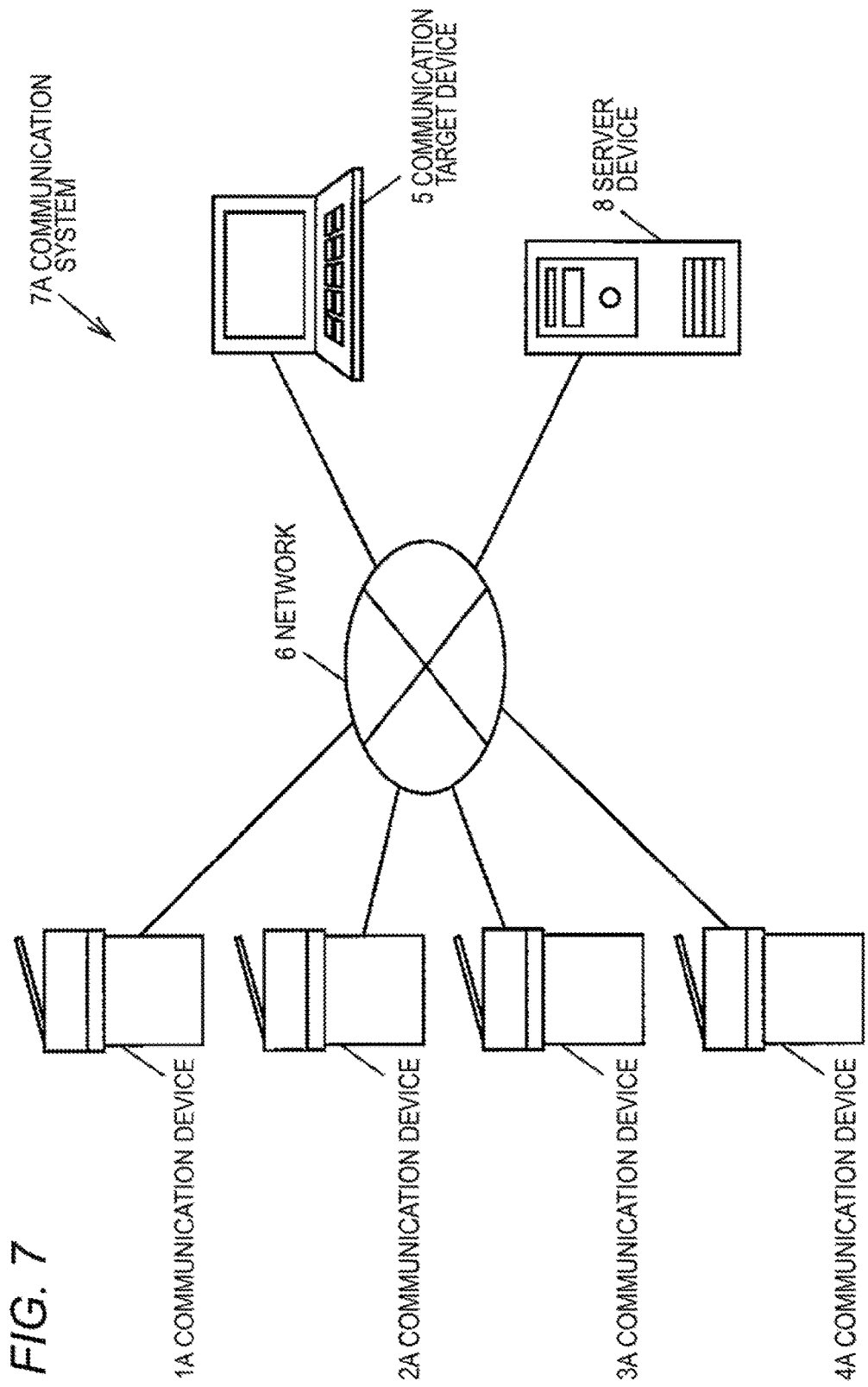
FIG. 7 is a schematic diagram illustrating an example of a configuration of a communication system according to a second exemplary embodiment.

FIG. 7 is a schematic diagram illustrating an example of a configuration of a communication system according to the second exemplary embodiment.

A communication system 7A has a structure in which communication devices 1A to 4A, a communication target device 5, and a server device 8 are connected to each other through a network 6, so as to enable communication with each other.

As an example, the communication devices 1A to 4A may be a multifunction machine which includes functions of printing, scanning, FAX, and the like, and may be a communication device communicating with the communication target device 5 in order to perform the function. The communication device 1 includes an electronic component such as a central processing unit (CPU) or a flash memory, in the main body. The electronic component has a function for processing information.

The server device 8 communicates with the communication devices 1A to 4A. The server device 8 includes an electronic component (such as a central processing unit (CPU) or a flash memory) which has a function filer processing information, in the main body.

Figure 8:
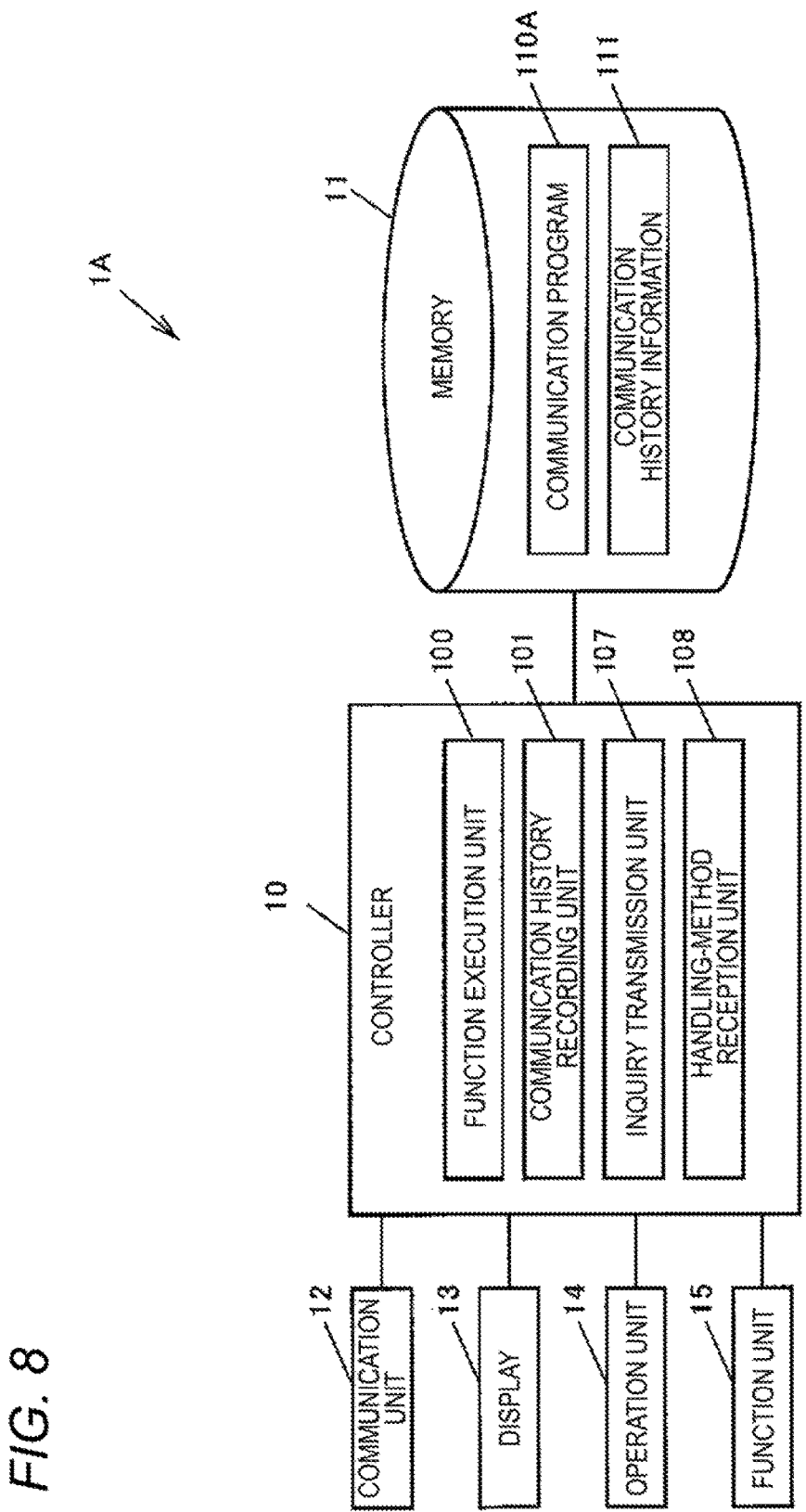
FIG. 8 is a block diagram illustrating a configuration example of a communication device according to the second exemplary embodiment.

FIG. 8 is a block diagram illustrating a configuration example of the communication device 1A according to the second exemplary embodiment.

A controller 10 of the communication device 1A executes a communication program 110A (which will be described later) so as to perform functions as a function execution unit 100, a communication history recording unit 101, an inquiry transmission unit 107, a handling-method reception unit 108, and the like.

The inquiry transmission unit 107 inquires a coping method corresponding to an error code, and a setting value appropriate for the coping method, of the server device 8.

The handling-method reception unit 108 receives a coping method corresponding to the error code, and a setting value appropriate for the coping method, from the server device 8.

The memory 11 stores the communication program 110A for operating the controller 10 as the above-described units 100, 101, 107, and 108, communication history information 111, and the like.

Figure 9:
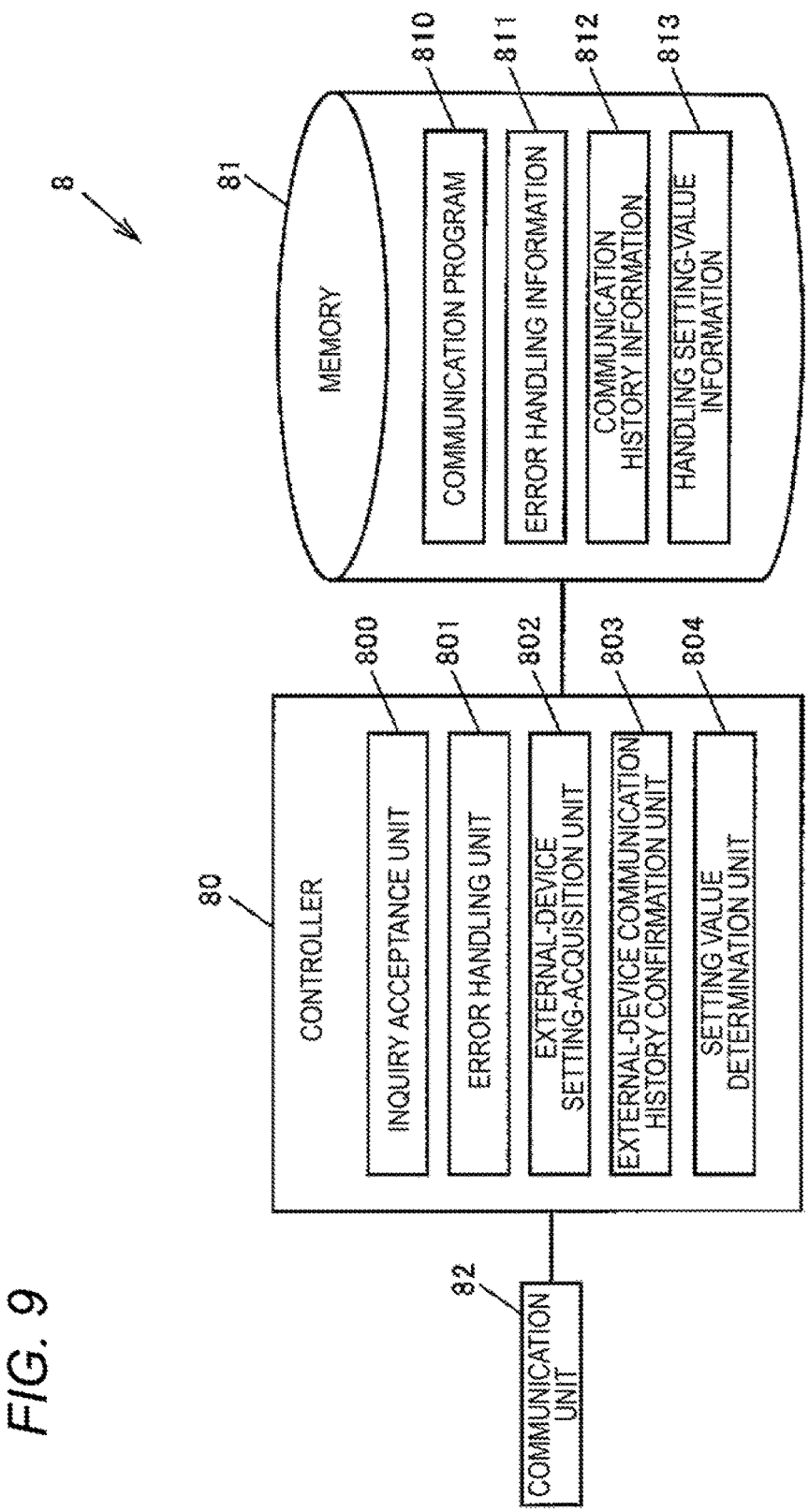
FIG. 9 is a block diagram illustrating a configuration example of a server device according to the second exemplary embodiment.

FIG. 9 is a block diagram illustrating a configuration example of the server device 8 according to the second exemplary embodiment.

The server device 8 includes a controller 80, a memory 81, and a communication unit 82. The controller 80 is configured from a CPU and the like. The controller 80 controls the units and executes various programs. The memory 81 is configured from a recording medium such as a flash memory, and stores information. The communication unit 82 performs communication with an external device through a network.

The controller 80 executes a communication program 810 (which will be described later) so as to perform functions as an inquiry acceptance unit 800, an error handling unit 801, an external-device setting-acquiring unit 802, an external-device communication history confirmation unit 803, a setting value determination unit 804, and the like.

The inquiry acceptance unit 800 receives an inquiry of a coping method corresponding to an error code, and a setting value appropriate for the coping method from the communication device 1A.

The error handling unit 801 refers error handling information 811 regarding a predetermined coping method for an error code, and selects, the corresponding coping method so as to, handle the error.

The external-device setting-acquiring unit 802 inquires a setting value of the coping method selected by the error handling unit 801, of the communication devices 2A to 4A. The external-device setting-acquiring unit 802 acquires setting values from the communication devices 2A to 4A.

The external-device communication history confirmation unit 803 performs inquiry for the communication devices 2A to 4A, and confirms communication history of each of the communication devices 2A to 4A. Particularly, the external-device communication history confirmation unit 803 confirms that an error occurs with the setting value acquired by the external-device setting-acquiring unit 802, in the communication devices 2A to 4A.

As an example of confirming whether an error does not occur with the setting value acquired by the external-device setting-acquiring unit 802, in the communication devices 2A to 4A, for example, the following methods are exemplified. As a first method, the communication device 1A confirms a time when the setting value is set, from the communication history confirmed by the external-device communication history confirmation unit 803. The communication device 1A determines whether or not an error having the same error code as that of an error which occurs this time in the communication device 1A occurs in the communication subsequent to the time when the setting value is set. As a second method, the communication device 1A performs an inquiry for the communication devices 2A to 4A. When a setting time of the setting value is previously recorded in the communication history of each of the devices 2A to 4A, and an inquiry of the communication history from the communication device 1A occurs, each of the communication devices 2A to 4A acquires an error code matching with an error code of the error which occurs this time in the communication device 1A. Each of the communication devices 2A to 4A determines whether or not an error having the acquired error code occurs in the communication subsequent to the setting time of the setting value at which an acquisition request is received. Each of the communication devices 2A to 4A transmits a result of the determination as a response, to the communication device 1A.

The setting value determination unit 804 determines a setting value of the coping method selected by the error handling unit 801, based on the setting values acquired by the external-device setting-acquiring unit 802. The setting value determination unit 804 determines the setting value in accordance with details confirmed by the external-device communication history confirmation unit 803.

The memory 81 stores the communication program 810 of operating the controller 80 as the above-described units 800 to 804, error handling information 811, communication history information 812, handling setting-value information 813, and the like.

Operation of Communication System

Figure 13:
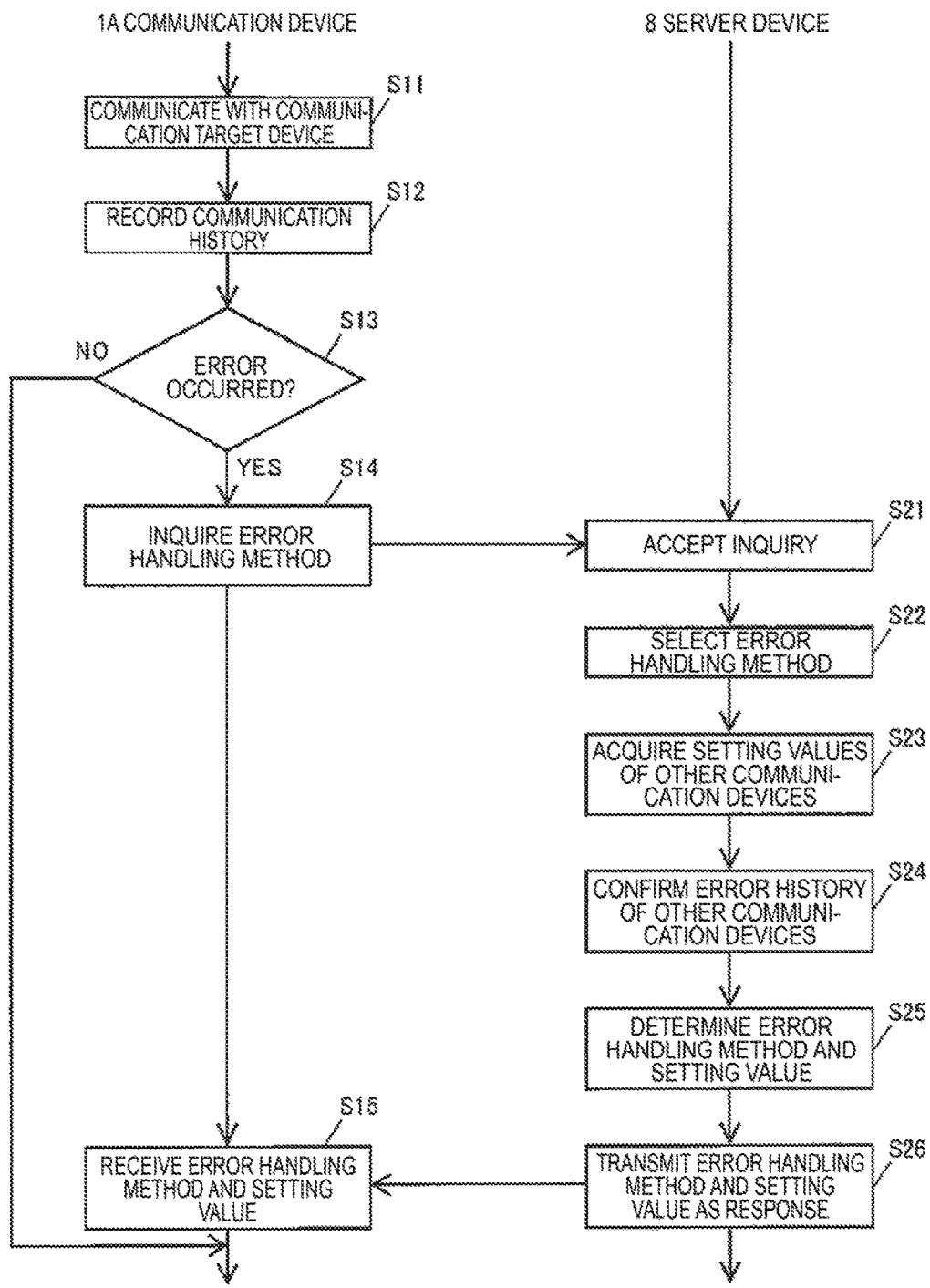
FIG. 13 is a flowchart illustrating an example of of operation of the communication system.

Next, an action in the exemplary embodiment will be described. FIG. 13 is a flowchart illustrating an example of an operation of the communication system.

Firstly, if the operation unit 14 receives an operation, the function execution unit 100 causes the function unit 15 to perform "Scan to SMB". The function unit 15 scans an original document so as to generate image information. The function unit 15 communicates with the communication target device 5 through the communication unit 12, in order to transmit the generated image information to the shared folder of the communication target device 5 (S11).

Then, the communication history recording unit 101 causes the function unit 15 to perform the function of "Scan to SMB". The communication history recording unit 101 records a communication result obtained when communication with the communication target device 5 is performed through the communication unit 12, as the communication history information 111 (S12). Particularly, in a case when an error occurs, similar to the first exemplary embodiment, the communication history recording unit 101 records an error code indicating the type of the error.

In the example of the second exemplary embodiment, it is set that an error having an error code of "E-PRN-001" and thus communication is abnormally ended when the communication device 1A performs scanning, for "Scan to SMB", image information generated by the scanning is transmitted to the communication target device 5.

Then, in a case where such an error occurs in the communication (S13; Yes), the inquiry transmission unit 107 inquires a coping method corresponding to the error code of "E-PRN-001", and a setting value appropriate for the copping method, of the server device 8 (S14).

Then, the inquiry acceptance unit 800 of the server device 8 receives the inquiry of the coping method corresponding to the error code and of the setting value appropriate for the coping method, from the communication device 1A (S21).

The error handling unit 801 refers the error handling information 811 having the same details as those of the error handling information 112 illustrated in FIG. 4, and selects the corresponding coping method (S22).

In the above-described example, the error code is "E-PRN-001". Thus, the error handling unit 801 refers to the error handling information 811, and selects a coping method of "increasing the simultaneous communication capable number" for a coping target of "multifunction machine" (which instructs the communication device as the coping method. Since the change timing is "during low operation", the selected coping method is performed when the communication device 1A is in a state during a low operation.

Then, the external-device setting-acquiring unit 802 inquires a setting value of the coping method selected by the error handling unit 801, of the communication devices 2A to 4A. The external-device setting-acquiring unit 802 acquires setting values from the communication devices 2A to 4A (S23).

FIG. 10 is a schematic diagram illustrating an example of the setting value acquired by the external-device setting-acquiring unit 802.

A setting value 802a includes a device name of an external device and the simultaneous communication capable number, which functions as an example of a setting value. The setting value 802a may be regularly acquired by the external-device setting-acquiring unit 802. The frequency of acquiring the setting value 802a may be random, and for example, the setting value may be acquired once per day.

The above example describes a case where a setting value of a device name "MFP-1" indicating the communication device 1A before changing is "2", but each of setting values of device names "MFP-2" to "MFP-4" indicating the communication devices 2A to 4A is "5".

Then, the external-device communication history confirmation unit 803 performs an inquiry for the communication devices 2A to 4A. The external-device communication history confirmation unit 803 confirms communication history of each of the communication devices 2A to 4A, and stores the confirmed communication history in the memory 81, as the communication history information 812. The external-device communication history confirmation unit 803 performs description like "the number of times of occurrence of E-PRN-001" in FIG. 10, for comparison (S6). Particularly the external-device communication history confirmation unit 803 confirms whether an error does not occur in the communication devices 2A to 4A with the setting Values of "5" acquired by the external-device setting-acquiring unit 802.

The setting value determination unit 804 determines a setting value of the coping method selected by the error handling unit 801, based on the setting values acquired by the external-device setting-acquiring unit 802.

Figure 11:
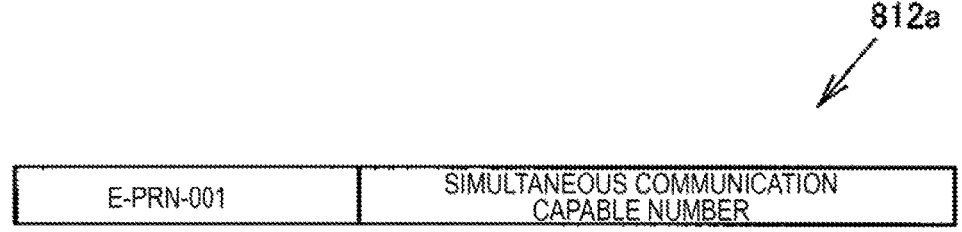
FIG. 11 is a schematic diagram illustrating an example of a configuration of a handling setting value determined by an error handling unit.

FIG. 11 is a schematic diagram illustrating a configuration of a handling setting value determined by the error handling unit 801.

That is, as illustrated in FIG. 10, since the setting values of the device names "MFP-2" to "MFP-4" which indicate external devices other than the device name "MFP-1" indicating the communication device 1 is "5", but "the number of times of occurrence of an error of E-PRN-001" in "MFP-3" is 2, as illustrated in FIG. 11, the error handling unit 801 determines, for example, "6" as the setting value (S25), and stores the determined value in the memory 81, as the handling setting value 813a.

The setting value determination unit 804 transmits the error handling method of "increasing the simultaneous communication capable number", and "6" as the simultaneous communication capable number which is the determined setting value, in a response to the inquiry from the communication device 1A (S26).

Then, the handling-method reception unit 108 of the communication device 1A receives the coping method corresponding to the error code, and the setting value appropriate for the coping method, from the server device 8 (S15). The handling-method reception unit 108 applies the received coping method and setting value to the setting value of the function execution unit 100.

Advantages of Second Exemplary Embodiment

According to the above-described second exemplary embodiment, since the server device 8 determines the coping method and the setting value for an error, a target for which the communication device 1A performs an inquiry may he only the server device 8, and thus it is possible to reduce the number of procedures required for the inquiry, in addition to the advantages of the first exemplary embodiment.

In a case where the server device 8 acquires the setting values of the communication devices 1A to 4A regularly, even if only an error code of the communication device 1A is received, the coping method and the setting value for the error can be determined. Thus, the number of procedures required for a response is reduced.

Other Exemplary Embodiment

The present invention is not limited to the above exemplary embodiments, and various modifications can be made in a range without departing from the gist of the present invention. For example, the communication devices 1 to 4 (1A to 4A) may store history of details of a change as change history information, in a case where the setting is changed.

FIG. 12 is a schematic diagram illustrating a configuration of the change history information.

Change history information 113 is information stored in the memory 11 by each of the communication devices 1 to 4 (1A to 4A). The change history information 113 includes a coping date and time when the setting value is changed for an error, an error code indicating the type of the error, setting information of the changed setting value, the setting value, and information regarding the main executing agent who performs the change.

In the example illustrated in FIG. 12, a message indicating that "a manager" sets "memory setting" to be "an HDD spool", and a message indicating that "MFP" which indicates the communication device 1 changes "the communication timeout time" to "60" seconds for an error code of "E-PRN-002" are recorded.

Recording the change history information 113 allows recognition of whether the change of the setting value is automatically performed by the communication device 1 (1A) or performed by a manager. If necessary, management of, for example, restoring the setting value is easily performed.

The functions of the units 100 to 108 and 800 to 804 of the controller 10 are realized by a program in the aforementioned exemplary embodiments. All or some of the units may be realized by hardware such as ASIC. The program used in the aforementioned exemplary embodiments may be stored in a recording medium such as a CD-ROM and be provided. The steps described in the aforementioned exemplary embodiment may be replaced, deleted, and added in the range without changing the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention, and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:

selecting, in a case where an error occurs in communication between a communication device and a communication target device that is a target of information from the communication device, a setting item to be changed in order to handle the occurred error by referring to information in which a type of an error is previously correlated with the setting item to be changed, the error occurring due to a setting of a communication protocol in the communication device and the target communication device;

acquiring a setting value of another communication device regarding the selected setting item;

determining a setting value of the communication device based on the acquired setting value of the other communication device;

correlating a change timing, at which the setting item to be changed is changed, with the type of the error and the setting item in the information; and changing the setting item to the setting value based on the determining at the change timing based on the selecting.

2. The non-transitory computer readable medium according to claim 1, wherein the process further comprises:
confirming whether or not occurrence of an error regarding the selected setting item is included in a communication history of the other communication device, and wherein the determining determines the setting value of the communication device based on whether or not an error has occurred in the other communication device by the setting value regarding the selected setting item.

3. A communication device comprising:

a memory configured to store a program; and a processor that is configured to execute, in response to being loaded with the program from the memory, a process including:

selecting, in a case where an error occurs in communication with a communication target device that is a target of information from the communication device, a setting item to be changed in order to handle the occurred error by referring to information in which a type of an error is previously correlated with the setting item to be changed, the error occurring due to a setting of a communication protocol in the communication device and the target communication device;

acquiring a setting value of another communication device regarding the selected setting item;

determining a setting value of the communication device based on the acquired setting value of the other communication device;

correlating a change timing, at which the setting item to be changed is changed, with the type of the error and the setting item in the information; and changing the selected setting item to the determined setting value at the change timing.

4. An information processing apparatus comprising:

a memory configured to store a program; and a processor that is configured to execute, in response to being loaded with the program from the memory, a process including:

selecting, in a case where an error occurs in communication between a communication device and a communication target device that is a target of information from the communication device, a setting item to be changed in order to handle the occurred error by referring to information in which a type of an error is previously correlated with the setting item to be changed, the error occurring due to a setting of a communication protocol in the communication device and the target communication device;

acquiring a setting value of another communication device regarding the selected setting item;

determining a setting value of the communication device based on the acquired setting value of the other communication device;

correlating a change timing, at which the setting item to be changed is changed, with the type of the error and the setting item in the information; and changing the selected setting item to the determined setting value at the change timing.

* * * * *